US012595823B2

(12) United States Patent
Alecu et al.

(10) Patent No.: US 12,595,823 B2
(45) Date of Patent: Apr. 7, 2026

(54) AIRCRAFT ENGINE WITH SQUEEZE FILM DAMPER

(71) Applicant: PRATT & WHITNEY CANADA CORP., Longueuil (CA)

(72) Inventors: Daniel Alecu, Brampton (CA); Laslo Tibor Diosady, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 8 days.

(21) Appl. No.: 18/318,261

(22) Filed: May 16, 2023

(65) Prior Publication Data

US 2024/0384754 A1    Nov. 21, 2024

(51) Int. Cl.
*F16C 27/04* (2006.01)
*F02C 7/06* (2006.01)

(52) U.S. Cl.
CPC .............. *F16C 27/045* (2013.01); *F02C 7/06* (2013.01); *F16C 2233/00* (2013.01); *F16C 2240/12* (2013.01); *F16C 2360/23* (2013.01)

(58) Field of Classification Search
CPC ................ F16C 27/045; F16C 2233/00; F16C 2240/12; F16C 2360/23; F02C 7/06; F01D 25/16; F01D 25/162; F01D 25/164
See application file for complete search history.

(56) References Cited

U.S. PATENT DOCUMENTS

| | | | | |
|---|---|---|---|---|
| 4,975,645 | A | * | 12/1990 | Lucas ..................... G01F 1/708 |
| | | | | 324/355 |
| 5,099,966 | A | | 3/1992 | Woehrl |
| 5,188,375 | A | | 2/1993 | Pope et al. |
| 5,228,784 | A | | 7/1993 | Bobo |
| 8,070,435 | B1 | | 12/2011 | Eng |
| 9,915,174 | B1 | * | 3/2018 | Morris ..................... F16F 9/02 |
| 10,900,379 | B2 | | 1/2021 | Gysling et al. |
| 2017/0298765 | A1 | | 10/2017 | Ertas et al. |
| 2018/0245628 | A1 | * | 8/2018 | Takaoka ................ F16C 35/063 |
| 2020/0256210 | A1 | * | 8/2020 | Gysling ............. F16F 15/0275 |

FOREIGN PATENT DOCUMENTS

| | | |
|---|---|---|
| EP | 3693632 | 8/2020 |

* cited by examiner

*Primary Examiner* — Elton K Wong
(74) *Attorney, Agent, or Firm* — NORTON ROSE FULBRIGHT CANADA LLP

(57) ABSTRACT

An aircraft engine is described which has: a shaft; a bearing housing extending around the shaft and defining a bearing cavity; a bearing within the bearing cavity and supporting the shaft; a squeeze film damper having an annulus receiving a damping fluid; and a controller. The controller is configured to: operate the squeeze film damper in a first regime in which a speed of the damping fluid in the annulus is less than a speed of sound in the damping fluid; determine that the shaft is subjected to vibrations having an amplitude greater than an amplitude threshold; and upon determining that the amplitude of the vibrations is greater than the amplitude threshold, operate the squeeze film damper in a second regime in which the speed of the damping fluid in the annulus is greater than the speed of sound in the damping fluid.

19 Claims, 7 Drawing Sheets

_FIG_.1

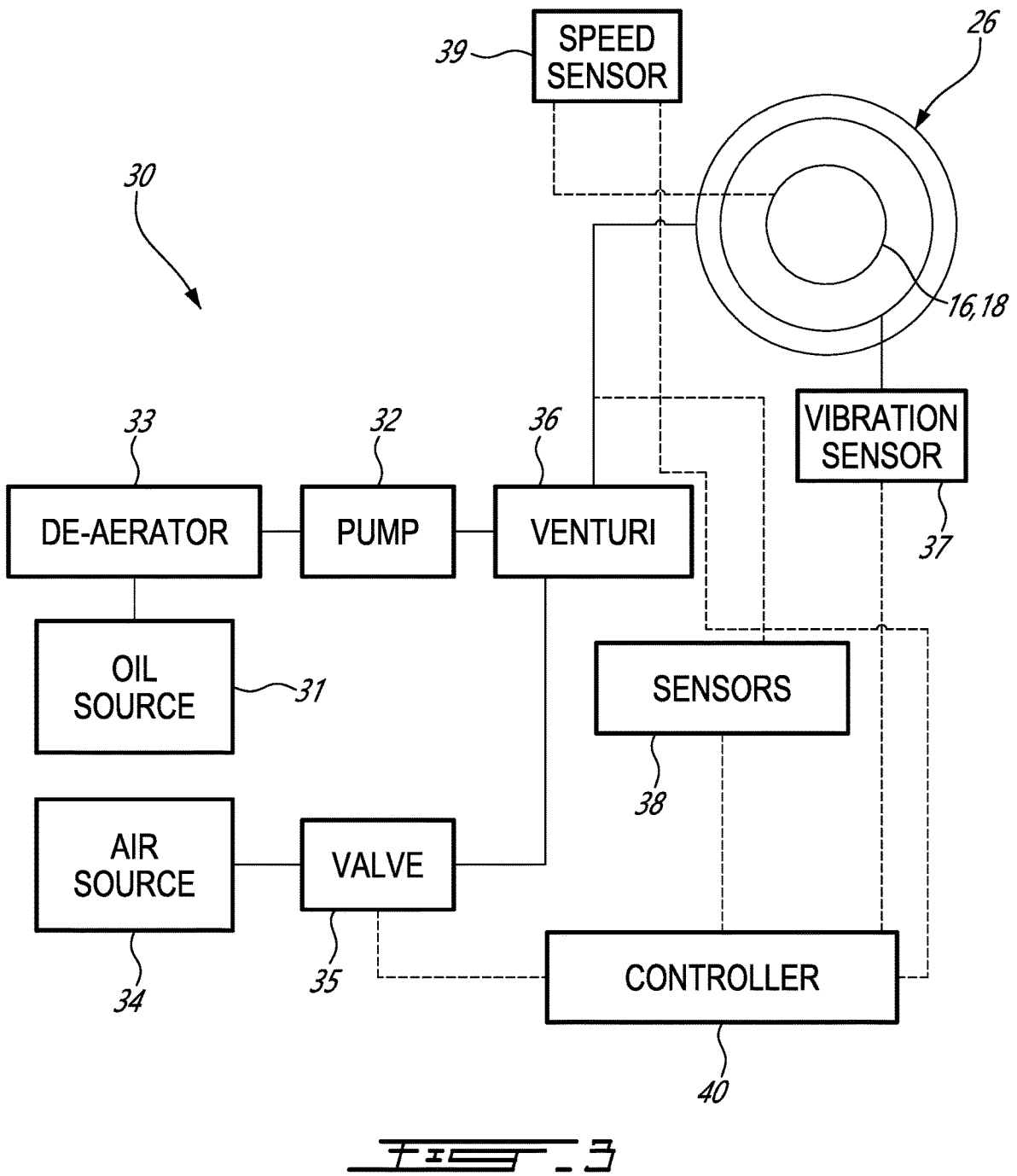

400

| Operate the squeeze film damper in a first regime in which a speed of a damping fluid in an annulus of the squeeze film damper is less than a speed of sound in the damping fluid |
|---|

~402

| Determine that the shaft is subjected to vibrations having an amplitude greater than an amplitude threshold |
|---|

~404

| Upon determining that the amplitude of the vibrations is greater than the amplitude threshold, operate the squeeze film damper in a second regime in which the speed of the damping fluid in the annulus is greater than the speed of sound in the damping fluid. |
|---|

~406

4

*500*

Operate the squeeze film damper in a first regime providing a first damping coefficient, in the first regime a speed of the damping fluid in an annulus of the squeeze film damper is less than a speed of sound in the damping fluid

*502*

In response to a determination that the vibrations have an amplitude above an amplitude threshold, operating the squeeze film damper in a second regime providing a second damping coefficient greater than the first damping coefficient, in the second regime the speed of the damping fluid in the annulus is greater than the speed of sound in the damping fluid.

*504*

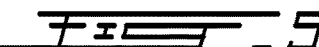

FIG. 5

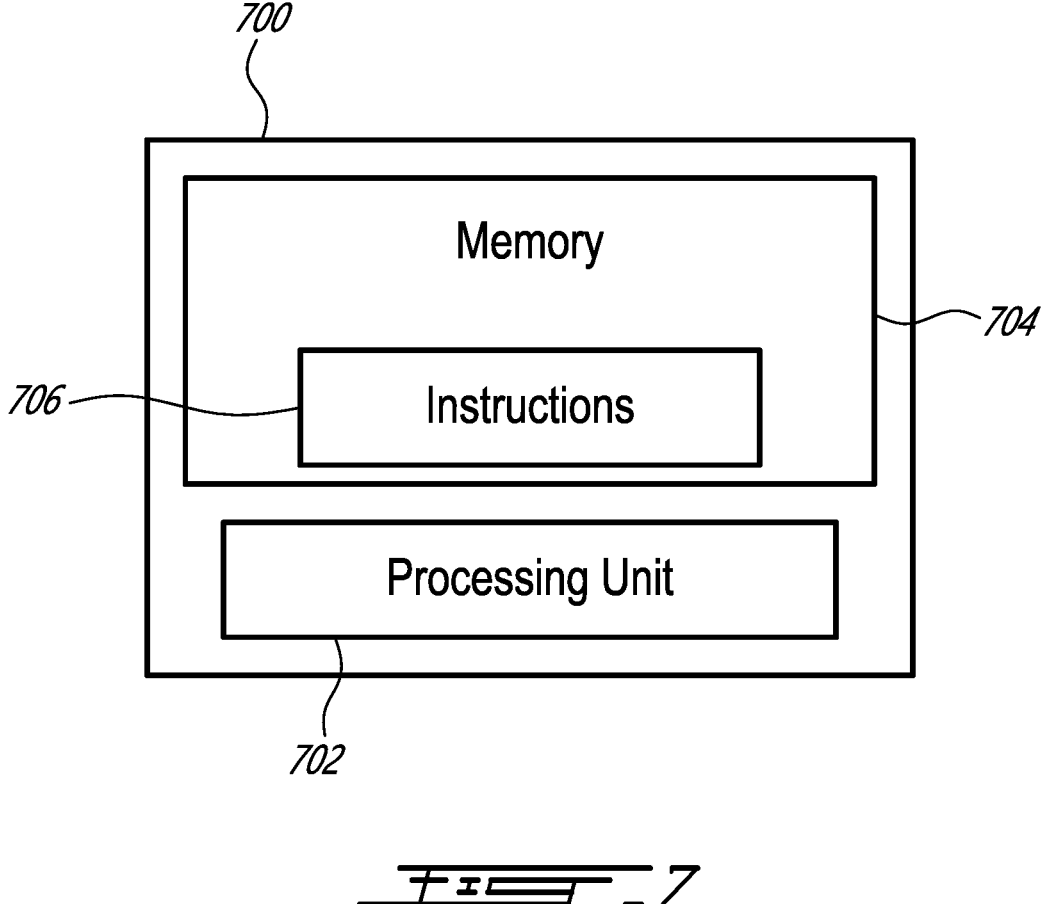

AIRCRAFT ENGINE WITH SQUEEZE FILM DAMPER

TECHNICAL FIELD

The disclosure relates generally to aircraft engines and, more particularly, to bearing assemblies and squeeze film dampers used with bearing assemblies.

BACKGROUND

Aircraft engines, such as gas turbine engines, use bearings for supporting shafts. Bearings are typically contained within bearing cavities defined by bearing housings, within which the bearings are radially supported. In some engines, squeeze film dampers are located radially between outer races of the bearings and the bearing housings. Such squeeze film dampers are continuously fed with oil and are used to at least partially dampen vibrations of the shaft. Squeeze film dampers vary in behavior with varying operating conditions, which may affect how they dampen vibrations. While suitable for the intended purposes, improvements are sought.

SUMMARY

In one aspect, there is provided an aircraft engine, comprising: a shaft rotatable about a central axis; a bearing housing extending around the shaft, the bearing housing defining a bearing cavity; a bearing located within the bearing cavity, the bearing rotatably supporting the shaft; a squeeze film damper having an annulus defined radially between the bearing and the bearing housing, the annulus receiving a damping fluid; and a controller having one or more data processors and a non-transitory machine-readable memory storing instructions executable by the one or more data processors and configured to cause the one or more data processors to: operate the squeeze film damper in a first regime in which a speed of the damping fluid in the annulus is less than a speed of sound in the damping fluid; determine that the shaft is subjected to vibrations having an amplitude greater than an amplitude threshold; and upon determining that the amplitude of the vibrations is greater than the amplitude threshold, operate the squeeze film damper in a second regime in which the speed of the damping fluid in the annulus is greater than the speed of sound in the damping fluid.

The aircraft engine defined above and described herein may include any one or more of the following features, in whole or in part, and in any combination.

In some embodiments, the instructions are configured to cause the one or more data processors to operate the squeeze film damper in the second regime by decreasing the speed of sound in the damping fluid.

In some embodiments, the instructions are configured to cause the one or more data processors to decrease the speed of sound in the damping fluid by one or more of: decreasing a pressure of oil of the damping fluid supplied to the annulus; and increasing an air relative volume in the damping fluid, the air relative volume defined as a ratio of a volume of air to a volume of oil by units of volume of the damping fluid.

In some embodiments, a valve is fluidly connecting an air source to the annulus.

In some embodiments, the instructions are configured to cause the one or more data processors to inject air in the damping fluid by opening the valve fluidly connecting the air source to the annulus.

In some embodiments, a venturi has an air inlet fluidly connected to the air source, an oil inlet fluidly connected to an oil source, and an outlet fluidly connected to the annulus.

In some embodiments, the instructions are configured to cause the one or more data processors to determine that the shaft is subjected to the vibrations having the amplitude greater than the amplitude threshold by receiving a signal from a vibration sensor.

In some embodiments, a sensor is operatively connected to the controller, the sensor operable to send a signal indicative of the air relative volume in the damping fluid.

In some embodiments, the sensor is a capacitor.

In some embodiments, in the first regime, the squeeze film damper provides a first damping coefficient, and in the second regime, the squeeze film damper provides a second damping coefficient greater than the first damping coefficient.

In another aspect, there is provided a method of damping vibrations of a shaft relative to a housing using a squeeze film damper having an annulus receiving a damping fluid, comprising: operating the squeeze film damper in a first regime providing a first damping coefficient, in the first regime a speed of the damping fluid in the annulus of the squeeze film damper is less than a speed of sound in the damping fluid; and in response to a determination that the vibrations have an amplitude above an amplitude threshold, operating the squeeze film damper in a second regime providing a second damping coefficient greater than the first damping coefficient, in the second regime the speed of the damping fluid in the annulus is greater than the speed of sound in the damping fluid.

In yet another aspect, there is provided a method of damping vibrations of a shaft relative to a housing using a squeeze film damper having an annulus receiving a damping fluid, comprising: determining an amplitude of the vibrations; and performing at least one of: upon determination that the amplitude is below an amplitude threshold, operating the squeeze film damper in a first regime providing a first damping coefficient, wherein in the first regime a speed of the damping fluid in the annulus of the squeeze film damper is less than a speed of sound in the damping fluid; and upon determination that the amplitude is greater than or equal to the amplitude threshold, operating the squeeze film damper in a second regime providing a second damping coefficient greater than the first damping coefficient, wherein in the second regime the speed of the damping fluid in the annulus is greater than the speed of sound in the damping fluid.

The methods defined above and described herein may include any one or more of the following features, in whole or in part, and in any combination.

In some embodiments, the operating of the squeeze film damper in the second regime includes decreasing the speed of sound in the damping fluid.

In some embodiments, in the decreasing of the speed of sound in the damping fluid includes one or more of decreasing a pressure of oil of the damping fluid supplied to the annulus and increasing an air relative volume in the damping fluid, the air relative volume defined as a ratio of a volume of air to a volume of oil by units of volume of the damping fluid.

In some embodiments, the increasing of the air relative volume in the damping fluid includes injecting air in the damping fluid by opening a valve fluidly connecting an air source to the annulus.

In some embodiments, the increasing of the air relative volume in the damping fluid includes mixing the air with oil via a venturi.

In some embodiments, the opening of the valve includes subjecting a valve member of the valve to the vibrations, the valve member engaged by a biasing member having a stiffness selected such that the valve member is engaged to a valve seat when the vibrations have the amplitude below the amplitude threshold and intermittently offset from the valve seat when the vibrations have the amplitude above the second amplitude threshold to allow fluid communication between the air source and the annulus through the valve.

In some embodiments, the method includes determining the air relative volume based on sensor data received from a sensor.

In some embodiments, the sensor comprises a capacitor.

In some embodiments, the method includes determining that the shaft is subjected to the vibrations having the amplitude greater than the second amplitude threshold by receiving a signal from a vibration sensor operatively connected to the shaft; and measuring the amplitude based on the signal.

BRIEF DESCRIPTION OF THE DRAWINGS

Reference is now made to the accompanying figures in which:

FIG. 3 is a schematic view of an oil system for supplying a damping fluid to a squeeze film damper of the bearing assembly of FIG. 2;

FIG. 4 is a flowchart illustrating steps of a method of damping vibrations with the squeeze film damper of FIG. 3;

FIG. 5 is another flowchart illustrating steps of another method of damping vibrations with the squeeze film damper of FIG. 3;

FIG. 7 is a schematic representation of a controller in accordance with one embodiment of the present disclosure.

DETAILED DESCRIPTION

Figure 1:
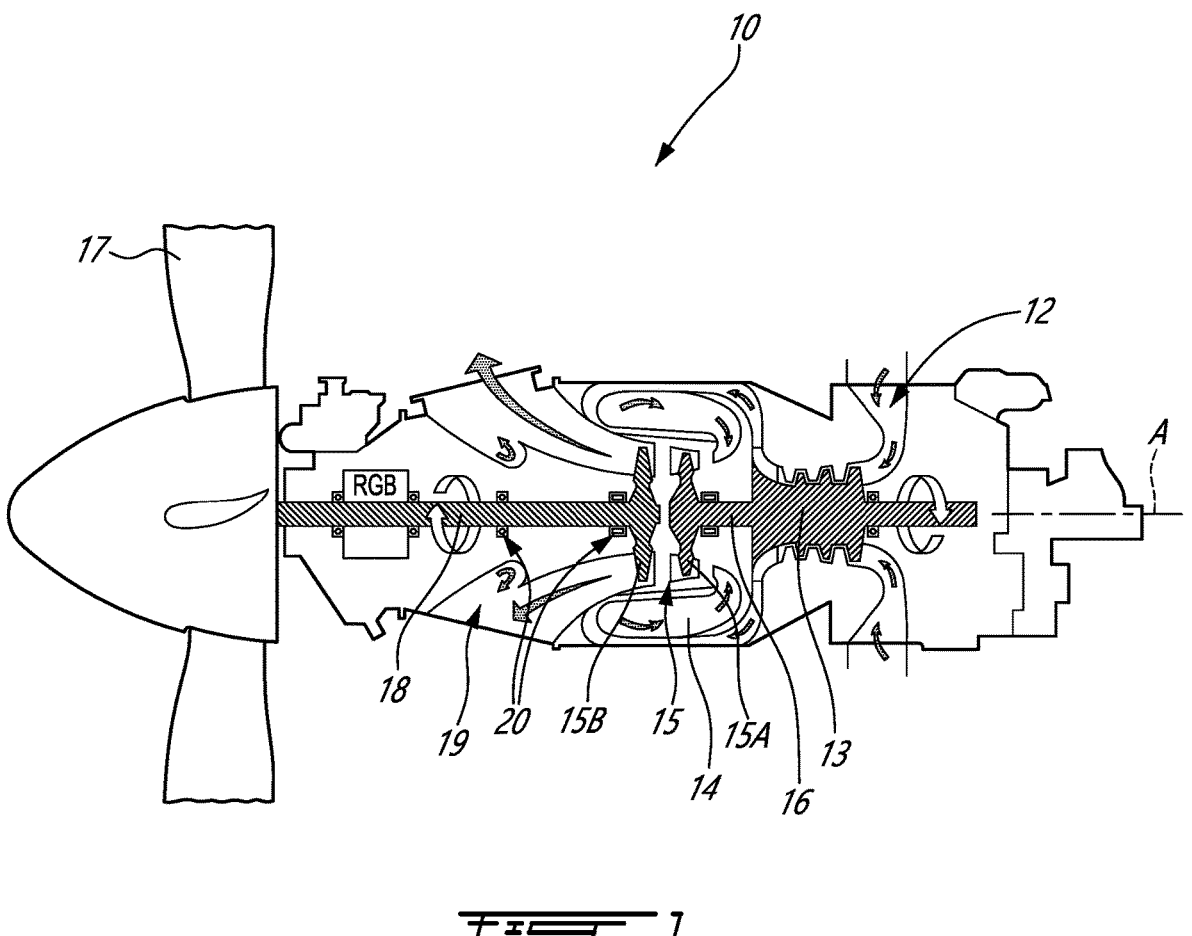
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising, in serial flow communication, an inlet 12 for receiving air, a compressor section 13 for compressing the air received via the inlet 12, a combustor 14 for mixing fuel with the compressed air and for generating an annular stream of combustion gases, and a turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18. The gas turbine engine 10 may alternatively be another type of engine, for example a turbofan engine or a turboshaft engine. The high-pressure shaft 16 and the low-pressure shaft 18 are rollingly supported by bearings. As understood by one skilled in the art, alternate engine types include additional or alternate components. For a non-limiting example, a turbofan engine includes a fan in lieu of the propeller 17.

Figure 2:
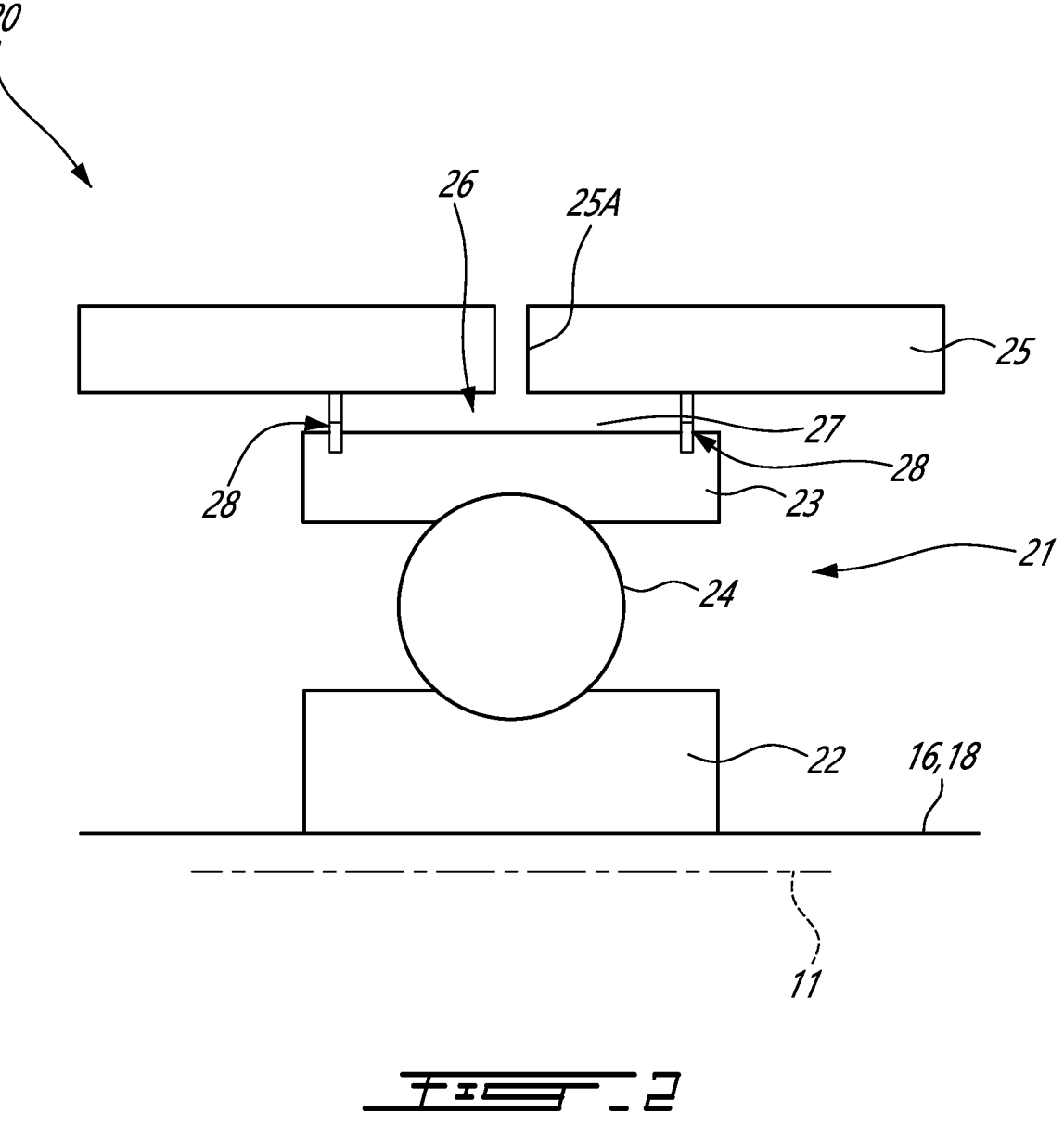
FIG. 2 is a cross-sectional view of a bearing assembly of the gas turbine engine of FIG. 1.

Referring now to FIG. 2, a bearing assembly is shown at 20. The bearing assembly 20 includes a bearing 21. Although the bearing assembly 20 is depicted as containing only one bearing 21, it may alternatively contain a plurality of bearings 21. The bearing 21 has an inner race 22 secured to a shaft, such as the high-pressure shaft 16 or the low-pressure shaft 18, an outer race 23 surrounding the inner race 22, and rolling elements 24, such as balls or cylindrical rollers, disposed radially between the inner race 22 and the outer race 23. The rolling elements 24 rotate about their respective central axis and about the central axis 11 of the gas turbine engine 10 to permit a rotation of the inner race 22 relative to the outer race 23. The outer race 23 is typically non-rotatable relative to the central axis 11 and is secured to a bearing housing 25. The bearing housing 25 is secured to an outer case of the gas turbine engine 10. Thus, loads may be transmitted along a load path extending radially outwardly from the shaft to the outer casing through the bearing 21 and the bearing housing 25. However, in some situations, the shaft may not be perfectly balanced. This imbalance may create vibrations. To at least partially alleviate these vibrations, a squeeze film damper 26 is disposed radially between the bearing 21 and the bearing housing 25. More particularly, the squeeze film damper 26 is located between the outer race 23 and the bearing housing 25. The squeeze film damper 26 is thus part of the load path that transfers the load from the shaft to the outer casing of the gas turbine engine 10.

The vibrations may be caused by many phenomena. For instance, the shaft may not be perfectly balanced. In some cases, ice may accrue on rotating parts of the compressor section 13 and/or of the turbine section 15. The ice may not accrue in a perfectly axisymmetric manner thus causing an assembly of the compressor section 13, turbine section 15, and shaft 16, 18, commonly referred to as a spool, to become rotationally imbalanced. Vibrations may thus be generated by this imbalance. The squeeze film damper 26 is used to at least partially alleviate these vibrations.

The squeeze film damper 26 includes an annulus 27, also referred to as an annular cavity, that extends circumferentially all around the central axis 11 and that contains a damping fluid, typically a mixture of oil and air. Sealing rings 28 are disposed proximate opposed axial ends of the annulus 27 to restrict a flow rate of the damping fluid out of the annulus 27. These sealing rings 28 may be received within grooves defined by one or more of the outer race 23 and the bearing housing 25 and are radially compliant to permit a radial motion of the outer race 23 relative to the bearing housing 25. The sealing rings 28 are used to create a flow resistance to the damping fluid leaving the annulus 27 (thereby limiting leakage of the damping fluid axially and/or away from the bearing cavity). The bearing housing 25 defines an inlet 25A for supplying the oil to the squeeze film damper 26. In use, the annulus 27 is continuously fed with the damping fluid that flows out thereof through the sealing rings 28 and that is received within the bearing cavity for lubrication of the bearing 21. The damping fluid is then scavenged and flown back to an oil reservoir.

Referring now to FIG. 3, an oil system of the gas turbine engine 10 is shown at 30. The oil system 30 is used to carry many functions such as supplying the bearing cavity defined by the bearing housing 25 with oil for lubricating the bearing 21. The oil system 30 may further power some hydraulic actuators and may be used for cooling some components of the gas turbine engine 10. In this case, the oil system 30 is further used to supply the squeeze film damper 26 with the damping fluid, which corresponds to a mixture of oil and air.

The oil system 30 includes an oil source 31, such as an oil reservoir, fluidly connected to the squeeze film damper 26 via a suitable fluid line. A pump 32 fluidly connects the oil source 31 to the squeeze film damper 26. The pump 32 is used to drive a flow of oil from the oil source 31 to the squeeze film damper 26. The oil may contain a certain amount of air. Put differently, the fluid drawn from the oil source 31 by the pump 32 may be a mixture of oil and air. A de-aerator 33 is in fluid communication with the oil source 31 upstream of the squeeze film damper 26. In the present embodiment, the de-aerator 33 is located upstream of the pump 32, but may alternatively be located downstream of the pump 32. The de-aerator 33 is used to remove at least a portion of the air contained in the oil before feeding the oil to the bearing cavity for lubricating the bearing 21. In this embodiment, a portion of the oil drawn from the oil source 31 is also used to feed the squeeze film damper 26. The de-aerator 33 may be an active de-aerator in which air is separated from the oil via centrifugation. In some embodiments, the de-aerator 33 may be omitted. In such a case, the air may separate from the oil naturally as the oil sits in an oil tank.

Although the bearing housing 25 and the outer race 23 of the bearing 21 are not rotating one relative to the other, they may move relative to one another because of the vibrations imparted by the shaft on the bearing 21. The clearance or gap defined radially between the outer race 23 of the bearing 21 and the bearing housing 25 allows a whirling motion that imparts a wave-like motion of the damping fluid around the central axis 11. This whirling motion results in a pressure distribution that produces a net reaction force that is typically shifted in phase ahead of an eccentricity vector of the shaft. The reaction component along the eccentricity vector opposes the increase in eccentricity. A ratio between the reaction component and the eccentricity is referred to as the stiffness while a reaction component perpendicular to the eccentricity vector opposes an increase in the whirling velocity. A ratio between the perpendicular component and the whirling velocity is referred to as a damping coefficient.

In some cases, vibrations generated by the shaft 16, 18 may have an amplitude greater than an amplitude threshold. This situation may require the squeeze film damper 26 to be more compliant in order to dampen the vibrations. It has been found that a damping characteristic of the squeeze film damper 26 may be varied by varying one or more of a pressure of the damping fluid supplied to the squeeze film damper 26 and an air relative volume of the damping fluid. The air relative volume is defined as a ratio of a volume of air to a volume of oil by units of volume (e.g., cubic inch) of the damping fluid. The stiffness of the squeeze film damper 26 may be decreased by one or more of decreasing the pressure of the damping fluid and increasing the air relative volume. The latter has the effect of increasing a compressibility of the damping fluid. A greater compressibility may increase the ability of the squeeze film damper 26 to absorb or dampen vibrations.

In the embodiment shown, the oil system 30 includes a controller 40 configured to control the squeeze film damper 26 to vary its stiffness as a function of the vibrations that needs dampening. The controller 40 is able to vary parameters of operation of the squeeze film damper 26 to operate the squeeze film damper 26 in either one of two distinct regimes, referred to below as a first regime and a second regime. The first regime is typically used in normal operations when vibrations have an amplitude below a first amplitude threshold whereas the second regime is used when vibrations have amplitude above a second amplitude threshold. The second amplitude threshold is equal to or greater than the first amplitude threshold.

In the first regime, the squeeze film damper 26 may be characterized as stiff. In the first regime, a speed of the damping fluid in the annulus 27 is less than a speed of sound in the damping fluid. The speed of sound in the damping fluid corresponds to a speed at which sound waves travel within the damping fluid. Typically, the speed of sound is greater in liquids than it is in gas. In the second regime, the squeeze film damper 26 may be characterized as compliant. In the second regime, the speed of the damping fluid in the annulus 27 is greater than the speed of sound in the damping fluid.

Referring now to FIG. 4, a method of damping vibrations of a shaft relative to the bearing housing 25 via the squeeze film damper 26 is shown at 400. The method 400 includes operating the squeeze film damper 26 in a first regime in which the speed of a damping fluid in the annulus 27 of the squeeze film damper 26 is less than the speed of sound in the damping fluid at 402; determining that the shaft is subjected to vibrations having an amplitude greater than an amplitude threshold at 406; and operating the squeeze film damper 26 in a second regime in which the speed of the damping fluid in the annulus 27 is greater than the speed of sound in the damping fluid at 406. In the first regime, a Mach number of the damping fluid in the annulus 27 is less than 1. In the second regime, the Mach number of the damping fluid in the annulus 27 is greater than 1.

In the embodiment shown, the operating of the squeeze film damper in the second regime at 406 includes decreasing the speed of sound in the damping fluid. The decreasing of the speed of sound in the damping fluid includes one or more of decreasing a pressure of the oil of the damping fluid supplied to the annulus 27 and increasing the air relative volume in the damping fluid. Increasing the pressure of the oil may be done with the pump 32. A speed of the pump 32 may be increased such that the pump 32 generates a greater oil pressure in the annulus 27. The air relative volume in the damping fluid may be increased by injecting air in the damping fluid. The air injected in the damping fluid may be supplied form an air source 34 (FIG. 3). The air source 34 may be an air outlet of the de-aerator 33. The air source 34 may be a bleed outlet of the compressor section 13 of the gas turbine engine 10. The air source 34 may alternatively be an air tank or any other suitable air source. The air source 34 may be replaced by any gas source (e.g., nitrogen).

As shown in FIG. 3, the air source 34 is fluidly connected to the annulus 27 through a valve 35. The valve 35 has a closed configuration in which the valve 35 prevents fluid communication between the air source 34 and the annulus 27 and an open configuration in which the air source 34 is fluidly connected to the annulus 27 through the valve 35. The injecting of the air may include opening the valve 35 to fluidly connect the air source 34 to the annulus 27.

In the present embodiment, the air is mixed with the oil exiting the pump 32 before being injected in to the annulus 27. To do so, the air source 34 is fluidly connected to the annulus 27 through the valve 35 and through a venturi 36.

The venturi 36 has an oil inlet fluidly connected to the pump 32, an air inlet fluidly connected to the air source 34, and a damping fluid outlet fluidly connected to the annulus 27. The venturi 36 therefore mixes incoming flows of oil and air into a outgoing flow of the damping fluid that corresponds to a mixture of air and oil. The venturi 36 may be used to allow air to be injected from a low-pressure source, such as ambient air at atmospheric pressure. In some embodiments, the venturi 36 may be omitted and the air may be injected directly in the fluid lines that connects the pump 32 to the annulus 27. The venturi 36 may create a suctioning effect caused by the flow of the oil. This suctioning effect may suction the air to increase the air relative volume of the damping fluid.

The determining that the shaft is subjected to the vibrations having the amplitude greater than the amplitude threshold at 404 may include receiving a signal from a vibration sensor 37 operatively connected to the shaft. The vibration sensor 37 is operable to generate a signal indicative of an amplitude of the vibrations. Any suitable sensor may be used. The oil system 30 may be further equipped with sensors 38. The sensors 38 may include a pressure sensor operatively connected to the oil system 30 (e.g., to a fluid line) to generate a signal indicative of a pressure of the damping fluid supplied to the annulus 27. The method 400 may include, in certain embodiments, determining the air relative volume based on sensor data received from the sensor. The sensors 38 may further include a capacitor or any suitable sensor able to generate a signal indicative of the air relative volume of the damping fluid supplied to the annulus 27. In one embodiment, the capacitor is able to measure an electrical resistance through the damping fluid. The electrical resistance is expected to increase with an increase in the air relative volume. The controller 40 may contain a table correlating electrical resistance values with air relative volume values for the damping fluid. The controller 40 may thus be able to determine the air relative volume from this table. In another embodiment, the capacitor is configured to measure a dielectric constant of the damping fluid that is expected to decrease with an increase in the air relative volume. The controller 40 may, for example, contain a table correlating the dielectric values with the air relative volume values for the damping fluid and be able to determine the air relative volume from this table. A speed sensor 39 may be operatively connected to the shaft and operable to generate a signal indicative of the rotational speed of the shaft.

The pressure, the rotational speed of the shaft, and the air relative volume determined from the signals generated by the sensors 38, 39 may be used by the controller 40 to determine whether the equation below is satisfied:

$$N \cdot R > \sqrt{\frac{P}{\rho_{oil}} \cdot \frac{1}{RV_{air}(1 - RV_{air})}}$$

Where N is the rotational speed of the shaft in radians per second determined by the speed sensor 39, R is the radius of the annulus 27, P is the pressure of the damping fluid supplied to the annulus 27, $\rho_{oil}$ is the density of the oil supplied to the annulus 27, and $RV_{air}$ is the air relative volume. The above equation is valid for a damping fluid that corresponds to a mixture of a fluid (e.g., oil) and a gas (e.g., air).

The left-hand term of the equation above represents the speed at which the oil travels in the annulus 27 whereas the right-hand term of the equation above represents an approximation of the speed of sound of the damping fluid in the annulus 27 at a reference pressure P of the damping fluid. The above equation represents the second regime in which the speed of the damping fluid is greater than the speed of sound of the damping fluid.

When it is desired to operate the squeeze film damper 26 in the second regime, the controller 40 may adjust one or more of the pressure P of the oil and the air relative volume $RV_{air}$ to decrease the speed of sound of the damping fluid until the above equation is met.

Referring now to FIG. 5, another method of damping the vibrations of the shaft is shown at 500. The method 500 includes, operate the squeeze film damper 26 in a first regime providing a first damping coefficient at 502. In the first regime, a speed of the damping fluid in the annulus 27 of the squeeze film damper 26 is less than a speed of sound in the damping fluid. The method 500 further includes, in response to a determination that the vibrations have an amplitude above an amplitude threshold, operating the squeeze film damper 26 in a second regime providing a second damping coefficient greater than the first damping coefficient at 504. In the second regime, the speed of the damping fluid in the annulus 27 is greater than the speed of sound in the damping fluid.

The operating of the squeeze film damper 26 in the second regime may include decreasing the speed of sound in the damping fluid. The decreasing of the speed of sound in the damping fluid includes one or more of decreasing a pressure of oil of the damping fluid supplied to the annulus 27 and increasing an air relative volume in the damping fluid. As mentioned above, the air relative volume defined as a ratio of a volume of air to a volume of oil by units of volume of the damping fluid. To increase the air relative volume in the damping fluid, air may be injected in the damping fluid by opening the valve 35 fluidly connecting the air source 34 to the annulus 27. The venturi 36 may be used for mixing the air with oil.

The method 500 may be carried by the controller 40. The method 500 may further include determining the air relative volume with one of the sensors 38, which may be a capacitor. The method 500 may include determining that the shaft is subjected to the vibrations having the amplitude greater than the amplitude threshold. The determining that the shaft is subjected to the vibrations having the amplitude greater than the amplitude threshold includes receiving a signal from the vibration sensor 37 operatively connected to the shaft. Accordingly, determining that the shaft is subjected to the vibrations having the amplitude greater than the amplitude threshold includes, in certain embodiments, receiving a signal from the vibration sensor 37 operatively connected to the shaft; and determining the amplitude based on the signal.

Figure 6:
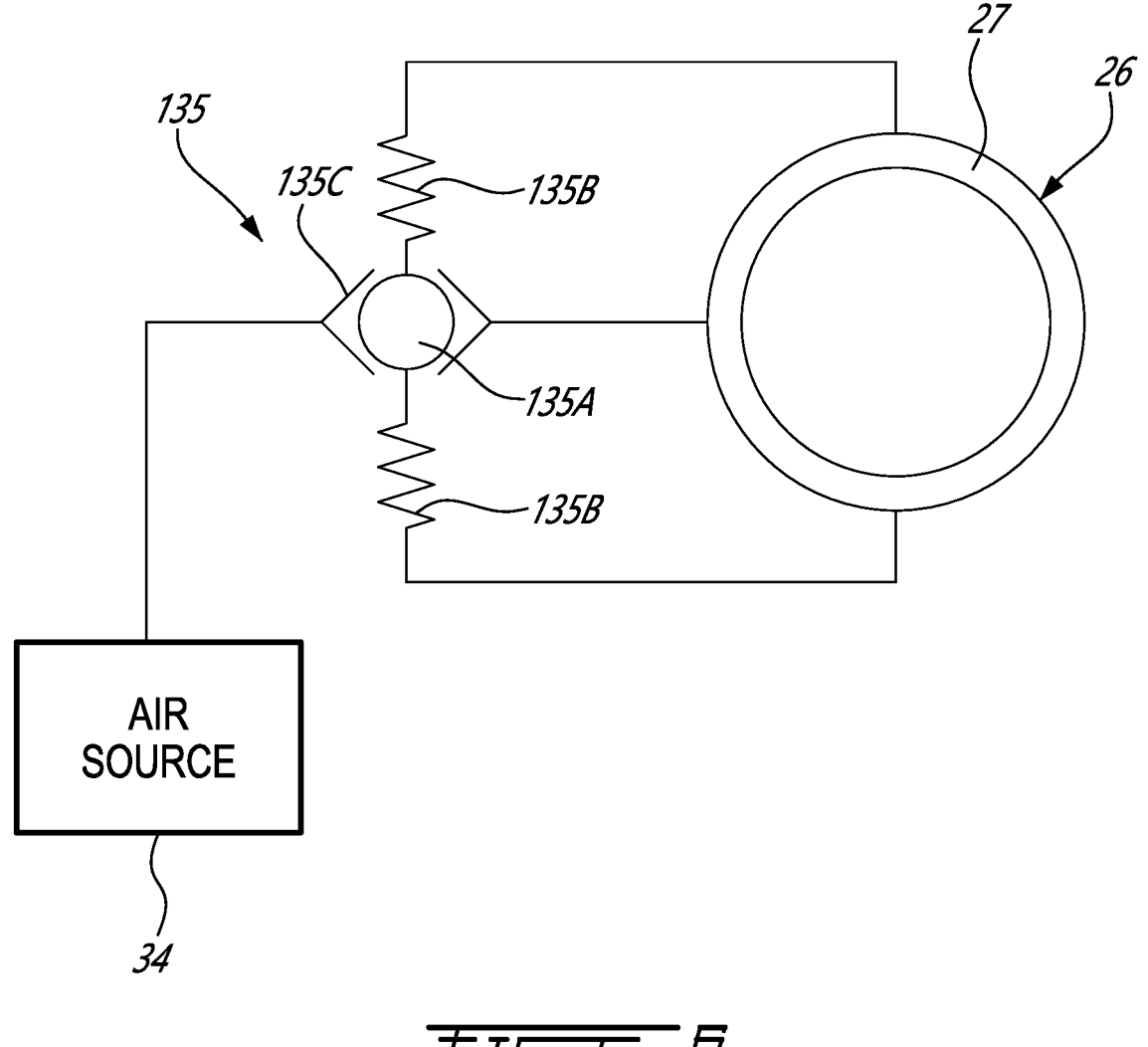
FIG. 6 is a schematic view of a valve to be used with the squeeze film damper of FIG. 3.

Referring now to FIG. 6, in an embodiment, the quantity of air injected in the annulus 27 may be passively controlled. The expression "passively" implies that the controller 40 is not needed to control the quantity of air injected in the annulus 27 to decrease the speed of sound of the damping fluid.

In this embodiment, a valve 135 fluidly connects the air source 34 to the annulus 27. The valve 135 includes a valve member 135A connected to the bearing housing 25 (depicted only schematically in FIG. 6) via one or more biasing members 135B (two are shown in FIG. 6, but only one or more than two may be used). The biasing member 135B has a stiffness selected such that the valve member 135A remains engaged to a valve seat 135C when the amplitude of the vibrations is below the amplitude threshold such that the valve 135 blocks fluid communication between the air source 34 and the annulus 27 and becomes intermittently offset from the valve seat 135C when the amplitude of the vibrations is above the amplitude threshold such that the valve 135 permits fluid communication between the air source 34 and the annulus 27. Put differently, when the amplitude of the vibrations is above the amplitude threshold, the valve member 135A, which herein corresponds to a ball, but any other suitable valve member may be used, oscillates between up and down positions that are both offset from the valve seat 135C. Thus, when the valve member 135A is in the up and down positions, it is offset from the valve seat 135C therefore opening the valve 135 to allow the air to flow through the valve 135 and past the valve member 135A. The more the bearing housing 25, and thus the valve member 135A, vibrates, the more air flows through the valve 135 to reach the annulus 27, and the lower is decreased the speed of sound of the damping fluid. This, in turn, increases the compressibility of the damping fluid thereby providing a greater damping of the vibrations.

In the method 500, a step of opening of the valve 135 may be performed by subjecting the valve member 135A of the valve 135 to the vibrations. As mentioned above, the stiffness of the biasing member 135B is selected such that the valve member 135A is engaged to the valve seat 135C when the vibrations have the amplitude below the amplitude threshold and intermittently offset from the valve seat 135C when the vibrations have the amplitude above the second amplitude threshold to allow fluid communication between the air source 34 and the annulus 27 through the valve 35.

Another method of opening the valve 135 may require one or more valve(s) each tuned to resonate to a respective frequency related to a shaft critical rotational speed. When the shaft operates at a speed close to the valve resonance, the valve oscillation amplitude may increase by resonance even at relatively low vibration level and release air into the damper in a narrow range of speeds.

With reference to FIG. 7, an example of a computing device 700 is illustrated. For simplicity only one computing device 700 is shown but the system may include more computing devices 700 operable to exchange data. The computing devices 700 may be the same or different types of devices. The controller 40 may be implemented with one or more computing devices 700. Note that the controller 40 can be implemented as part of a full-authority digital engine controls (FADEC) or other similar device, including electronic engine control (EEC), engine control unit (ECU), electronic propeller control, propeller control unit, and the like. In some embodiments, the controller 40 is implemented as a Flight Data Acquisition Storage and Transmission system, such as a FAST™ system. The controller 40 may be implemented in part in the FAST™ system and in part in the EEC. Other embodiments may also apply.

The computing device 700 comprises a processing unit 702 and a memory 704 which has stored therein computer-executable instructions 706. The processing unit 702 may comprise any suitable devices configured to implement the methods 400, 500 such that instructions 706, when executed by the computing device 700 or other programmable apparatus, may cause the functions/acts/steps performed as part of the method 400, 500 as described herein to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems for damping vibrations described herein may be implemented in a high level procedural or object oriented programming or scripting language, or a combination thereof, to communicate with or assist in the operation of a computer system, for example the computing device 700. Alternatively, the methods and systems for damping vibrations may be implemented in assembly or machine language. The language may be a compiled or interpreted language. Program code for implementing the methods and systems for damping vibrations may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for damping vibrations may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a shaft rotatable about a central axis;
a bearing housing extending around the shaft, the bearing housing defining a bearing cavity;
a bearing located within the bearing cavity, the bearing rotatably supporting the shaft;
a squeeze film damper having an annulus defined radially between the bearing and the bearing housing, the annulus receiving a damping fluid, the squeeze film damper operable in a selected one of two distinct regimes consisting of:
a first regime in which a speed of the damping fluid in the annulus is less than a speed of sound in the damping fluid; and
a second regime in which the speed of the damping fluid in the annulus is greater than the speed of sound in the damping fluid; and
a controller having one or more data processors and a non-transitory machine-readable memory storing instructions executable by the one or more data processors and configured to cause the one or more data processors to:
determine whether an amplitude of vibrations of the shaft is above or below an amplitude threshold;
in response to determining that the amplitude of the vibrations of the shaft is below the amplitude threshold, operate the squeeze film damper in the first regime; and in response to determining that the amplitude of the vibrations of the shaft is above the amplitude threshold, operate the squeeze film damper in the second regime.

2. The aircraft engine of claim 1, wherein the instructions are configured to cause the one or more data processors to operate the squeeze film damper in the second regime by decreasing the speed of sound in the damping fluid.

3. The aircraft engine of claim 2, wherein the instructions are configured to cause the one or more data processors to decrease the speed of sound in the damping fluid by one or more of: decreasing a pressure of oil of the damping fluid supplied to the annulus; and increasing an air relative volume in the damping fluid, the air relative volume defined as a ratio of a volume of air to a volume of oil by units of volume of the damping fluid.

4. The aircraft engine of claim 3, comprising a valve fluidly connecting an air source to the annulus.

5. The aircraft engine of claim 4, wherein the instructions are configured to cause the one or more data processors to inject air in the damping fluid by opening the valve fluidly connecting the air source to the annulus.

6. The aircraft engine of claim 4, comprising a venturi having an air inlet fluidly connected to the air source, an oil inlet fluidly connected to an oil source, and an outlet fluidly connected to the annulus.

7. The aircraft engine of claim 3, comprising a sensor operatively connected to the controller, the sensor operable to send a signal indicative of the air relative volume in the damping fluid.

8. The aircraft engine of claim 7, wherein the sensor is a capacitor.

9. The aircraft engine of claim 1, wherein the instructions are configured to cause the one or more data processors to determine that the shaft is subjected to the vibrations having the amplitude greater than the amplitude threshold by receiving a signal from a vibration sensor.

10. The aircraft engine of claim 1, wherein in the first regime, the squeeze film damper provides a first damping coefficient, and in the second regime, the squeeze film damper provides a second damping coefficient greater than the first damping coefficient.

11. A method of damping vibrations of a shaft relative to a housing using a squeeze film damper having an annulus receiving a damping fluid, the squeeze film damper operable in a selected one of two distinct regimes consisting of:
a first regime in which a speed of the damping fluid in the annulus is less than a speed of sound in the damping fluid; and
a second regime in which the speed of the damping fluid in the annulus is greater than the speed of sound in the damping fluid, the method comprising:
determining whether an amplitude of vibrations of the shaft is above or below an amplitude threshold;
in response to determining that the amplitude of the vibrations of the shaft is below the amplitude threshold, operating the squeeze film damper in the first regime providing a first damping coefficient; and
in response to determining that the amplitude of the vibrations is above the amplitude threshold, operating the squeeze film damper in the second regime providing a second damping coefficient greater than the first damping coefficient.

12. The method of claim 11, wherein the operating of the squeeze film damper in the second regime includes decreasing the speed of sound in the damping fluid.

US 12,595,823 B2

13

13. The method of claim 12, wherein the decreasing of the speed of sound in the damping fluid includes one or more of decreasing a pressure of oil of the damping fluid supplied to the annulus and increasing an air relative volume in the damping fluid, the air relative volume defined as a ratio of a volume of air to a volume of oil by units of volume of the damping fluid.

14. The method of claim 13, wherein the increasing of the air relative volume in the damping fluid includes injecting air in the damping fluid by opening a valve fluidly connecting an air source to the annulus.

15. The method of claim 14, wherein the opening of the valve includes subjecting a valve member of the valve to the vibrations, the valve member engaged by a biasing member having a stiffness selected such that the valve member is engaged to a valve seat when the vibrations have the amplitude below the amplitude threshold and intermittently offset from the valve seat when the vibrations have the amplitude above the second amplitude threshold to allow fluid communication between the air source and the annulus through the valve.

16. The method of claim 13, wherein the increasing of the air relative volume in the damping fluid includes mixing the air with oil via a venturi.

17. The method of claim 13, further comprising determining the air relative volume based on sensor data received from a sensor.

18. The method of claim 17, wherein the sensor comprises a capacitor.

19. The method of claim 11, further comprising:

determining that the shaft is subjected to the vibrations having the amplitude greater than the second amplitude threshold by receiving a signal from a vibration sensor operatively connected to the shaft; and measuring the amplitude based on the signal.

* * * * *